US010075055B2

(12) United States Patent
Qiu et al.

(10) Patent No.: US 10,075,055 B2
(45) Date of Patent: Sep. 11, 2018

(54) ZERO-VOLTAGE-SWITCHING SCHEME FOR PHASE SHIFT CONVERTERS

(71) Applicant: Apple Inc., Cupertino, CA (US)

(72) Inventors: Weihong Qiu, Cupertino, CA (US); Rohan Dayal, Cupertino, CA (US); Zaki Moussaoui, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 42 days.

(21) Appl. No.: 15/064,501

(22) Filed: Mar. 8, 2016

(65) Prior Publication Data

US 2017/0093269 A1    Mar. 30, 2017

Related U.S. Application Data

(60) Provisional application No. 62/235,046, filed on Sep. 30, 2015.

(51) Int. Cl.
*H02M 1/08* (2006.01)
*H02M 3/335* (2006.01)
*H02M 3/337* (2006.01)
*H02M 1/00* (2006.01)

(52) U.S. Cl.
CPC ......... *H02M 1/083* (2013.01); *H02M 3/3376* (2013.01); *H02M 3/33569* (2013.01); *H02M 2001/0032* (2013.01); *H02M 2001/0058* (2013.01); *Y02B 70/1491* (2013.01); *Y02B 70/16* (2013.01)

(58) Field of Classification Search
CPC .................................................. H02M 1/083
See application file for complete search history.

(56) References Cited

U.S. PATENT DOCUMENTS

| 6,356,462 B1 | 3/2002 | Jang | |
|---|---|---|---|
| 2013/0100707 A1* | 4/2013 | Hatakeyama | H02M 3/3376 363/17 |
| 2014/0254208 A1* | 9/2014 | Dai | H02M 3/335 363/21.02 |
| 2014/0376269 A1* | 12/2014 | Johnson | H02M 3/33507 363/17 |
| 2015/0349648 A1* | 12/2015 | Zane | H02M 3/33507 363/17 |

FOREIGN PATENT DOCUMENTS

| EP | 0926926 A1 | 6/1999 |
|---|---|---|
| EP | 1194008 A2 | 4/2002 |

* cited by examiner

*Primary Examiner* — Jue Zhang
(74) *Attorney, Agent, or Firm* — Blank Rome LLP

(57) ABSTRACT

This disclosure relates to improved designs for phase-shift power converters, and, in particular, full bridge converters. Phase-shift power converters may lose Zero-Voltage-Switching (ZVS) under some load conditions, e.g., light load conditions—which can result in large switching losses. In order to avoid these losses, additional LC tank circuits may be added into the system to generate an amount of negative current needed to maintain ZVS. However, permanently adding such LC tank circuits into the system will reduce the system's efficiency. By intelligently adjusting the number (and particular combination) of LC tank circuits included in the system at a given time, ZVS may be maintained under all load conditions, while the impact of the additional LC tank circuits on the converter's overall efficiency may be limited, e.g., by employing the minimum number of LC tank circuits for the minimum amount of time needed to maintain ZVS.

19 Claims, 10 Drawing Sheets

ZERO-VOLTAGE-SWITCHING SCHEME FOR PHASE SHIFT CONVERTERS

TECHNICAL FIELD

This disclosure relates generally to isolated converters using phase-shifting techniques (e.g., pulse width modulation, "PWM") to produce a desired output voltage level(s). More particularly, the use of "full-bridge" schemes will be discussed for the exemplary phase-shift converter embodiments disclosed herein. Other embodiments are also described herein.

BACKGROUND

Some factors hindering the operation of conventional ("hard-switched") PWM converters at higher switching frequencies are circuit parasitics, such as semiconductor junction capacitances, transformer leakage inductances, and rectifier reverse recovery. These parasitics can introduce additional switching losses and increase component stresses, and, consequently, limit the maximum frequency of operation of "hard-switched" converters. To operate converters at higher switching frequencies and, eventually, achieve higher power densities, it is helpful to eliminate, or at least reduce, the detrimental effects of parasitics while mitigating a degradation of conversion efficiency.

Generally, systems have attempted to eliminate these detrimental effects using one or both of two techniques: (1) resonant techniques (e.g., the introduction of permanent resonant tank circuits); and (2) constant-frequency PWM soft-switching techniques.

The common feature among the resonant techniques is the employment of a resonant tank circuit that is used to shape the current and voltage waveforms of the semiconductor switch(es) to create conditions for either zero-current turn-off, or zero-voltage turn-on. However, Zero-Current Switching (ZCS) and/or Zero-Voltage-Switching (ZVS) in resonant-type converters is often achieved at the expense of increased current and/or voltage stresses on the semiconductors in the system, as compared to the stresses in the corresponding "hard-switched" topologies. In addition, the majority of resonant topologies need to circulate a significant amount of energy to create ZCS or ZVS conditions, which increases conduction losses.

This strong trade-off between the switching-loss savings and increased conduction losses may result in a lower efficiency and/or larger size of a high-frequency resonant-type converter compared to its PWM counterpart operating at a lower frequency. This is often the case in applications with a wide input-voltage range. In addition, variable frequency of operation is often perceived as a disadvantage of resonant converters.

SUMMARY

This disclosure relates to improved designs for phase-shift power converters, and, in particular, full bridge converters. Phase-shift power converters may lose ZVS under some load conditions, e.g., light load conditions—which can result in large switching losses. In order to avoid these losses, additional LC tank circuits may be added into the system to generate an amount of negative current needed to maintain ZVS. However, permanently adding such LC tank circuits into the system will increase the Root-Mean-Squared (RMS) current of the main power switching, and thus reduce system efficiency. Moreover, the additional LC tank circuits are not needed to maintain ZVS at all load conditions, e.g., full load conditions.

The improved designs disclosed herein include intelligently-selectable LC tank circuits that may be added (or removed) from the system based on the present load conditions. For example, under heavy load conditions, no LC tank may be needed to maintain ZVS. However, as the load current drops, one small LC tank may be added into the circuit to generate enough negative current to maintain ZVS. Finally, under light load conditions, a large LC tank circuit (or, alternatively, one or more additional smaller LC tank circuits) may be enabled to generate a large enough negative current to maintain ZVS. Thus, by adjusting the number (and particular combination) of LC tank circuits included in the system, ZVS may be maintained under all load conditions, while the impact of the additional LC tank circuits on the converter's overall efficiency may be limited, e.g., by employing the minimum number of LC tank circuits (and for the minimum amount of time needed) to maintain ZVS.

One embodiment disclosed herein is a power conversion circuit comprising: first and second input nodes coupled to an input voltage; first and second output nodes coupled to a load; a plurality of switching devices operatively coupled to the first and second input nodes and the first and second output nodes and configured to operate as a full-bridge, phase shift converter, whereby controlling a phase shift between the switching of the switching devices regulates a load voltage; one or more resonant LC tank circuits configured to be selectively coupled to the output nodes in response to load conditions so as to maintain zero voltage switching of the switching devices.

Another embodiment disclosed herein is a full-bridge phase-shift converter comprising: a first switching device having an input coupled to a voltage source and an output coupled to input of a second switching device, the second switching device having its output coupled to a voltage reference, the connection between the output of the first switching device and the input of the second switching device being a first intermediate node; a third switching device having an input coupled to the voltage source and an output coupled to an input of a fourth switching device, the fourth switching device having its output coupled to the voltage reference, the connection between the output of the third switching device and the input of the fourth switching device being a second intermediate node, wherein a load is connected between the first and second intermediate nodes and a load voltage supplied to the load is regulated by controlling a phase shift between switching of the first and fourth switching devices and switching of the second and third switching devices; and one or more resonant LC tank circuits configured to be selectively coupled to the first intermediate node in response to load conditions so as to maintain zero voltage switching of the switching devices.

Yet another embodiment disclosed herein is a method of operating a power conversion circuit, comprising: operating a plurality of switching devices to selectively couple first and second input nodes to an input voltage; operating the plurality of switching devices to selectively couple first and second output nodes to a load, wherein the operation of the plurality of switching devices causes the power conversion circuit to act as a full-bridge, phase shift converter; controlling a phase shift between the switching of the switching devices to regulate a load voltage; and selectively coupling one or more resonant LC tank circuits to the first and second output nodes in response to load conditions, so as to maintain zero voltage switching of the switching devices.

The above Summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above Summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. Also, in the interest of conciseness, a given figure may be used to illustrate the features of more than one embodiment of the invention, or more than one species of the invention, and not all elements in the figure may be required for a given embodiment or species.

DETAILED DESCRIPTION

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

Figure 1:
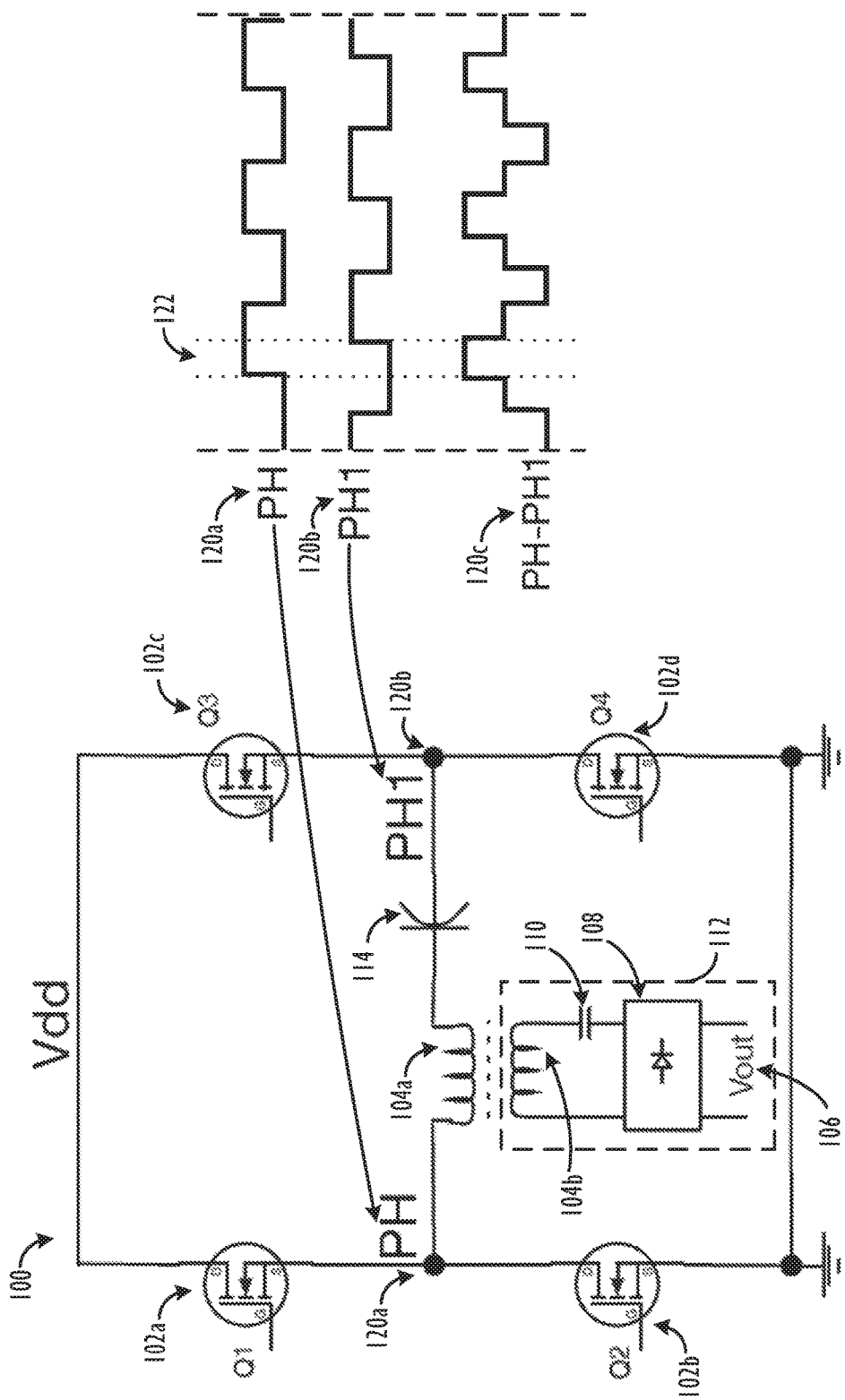
FIG. 1 is a block diagram of an exemplary phase-shift power conversion circuit and corresponding exemplary phase shift waveforms.

FIG. 1 is a block diagram 100 of an exemplary phase-shift power conversion circuit and corresponding exemplary phase-shift waveforms 120. Converter 100 may include: a plurality of switches, e.g., transistors 102a-102d, which may comprise MOSFETs or any other desirable switching mechanism; a primary winding of a transformer 104a, and a capacitor 114. The secondary, or output, side 112 of the isolated converter may comprise a corresponding secondary winding of the transformer 104b, a capacitor 110, rectification circuitry 108, and produce an output voltage, Vout 106.

Converter 100 may be operated as a full-bridge, phase-shift converter, e.g., with a first switching device, Q1 (102a), having an input coupled to a voltage source (Vdd) and an output coupled to input of a second switching device, Q2 (102b). The second switching device, Q2 (102b), may have its output coupled to a voltage reference, and the connection between the output of the first switching device, Q1 (102a), and the input of the second switching device, Q2 (102b), may be a first intermediate node, PH (120a), at which the voltage of the so-called "leading bridge" may be measured.

The converter 100 may further comprise a third switching device, Q3 (102c), having an input coupled to the voltage source (Vdd) and an output coupled to an input of a fourth switching device, Q4 (102d). The fourth switching device, Q4 (102d), may have its output coupled to the voltage reference, and the connection between the output of the third switching device, Q3 (102c), and the input of the fourth switching device, Q4 (102d), may be a second intermediate node, PH1 (120b), at which the voltage of the so-called "trailing bridge" may be measured. The load 112 may then be connected between the first and second intermediate nodes, and a load voltage supplied to the load may be regulated by controlling a phase shift between switching of the first and fourth switching devices (i.e., Q1 and Q4) and switching of the second and third switching devices (i.e., Q2 and Q3).

Further details regarding the phase shifting between the leading bridge and the trailing bridge are shown in the exemplary phase-shift waveforms 120. In particular, the first waveform, PH (120a), represents the voltage at the leading bridge, as discussed above. The first waveform, PH1 (120b), represents the voltage at the trailing bridge. The third waveform, PH-PH1 (120c), represents the phase-shifted voltage that is supplied to the load. As may be seen by range 122, signal PH-PH1 (120c) is at its peak when signal PH (120a) is at its maximum value and signal PH1 (120b) is at its minimum value. By controlling the amount of offset, i.e., the amount of phase-shift, between PH (120a) and PH1 (120b), the converter 100 may control how much voltage is applied to the load. As may now be more clearly understood, if there is no phase-shift between the leading and trailing legs of the bridge, no voltage will be applied across the primary winding 104a of the transformer and, consequently, the output voltage will be zero. On the other hand, if the phase shift between the leading and trailing legs of the bridge is 180 degrees, the maximum voltage will be applied across the primary winding 104a of the transformer, which will produce the maximum output voltage, Vout 106, at the load. When the phase-shift is at its maximum value, the PH (120a) and PH1 (120b) switching time (i.e., when its voltage changes from low to high or high to low) happens at the maximum negative current amount. As the phase-shift value is reduced, the current at the switching time starts to increase. Eventually, when the phase-shift becomes large enough, the current at the switching time may become positive, and ZVS may be lost.

Full-bridge converters, such as converter 100 shown in FIG. 1, are a popular scheme for isolated converters. Phase-shift control is a good scheme for full-bridge converters because each bridge may be run at fixed frequency and fixed duty cycle (e.g., a 50% duty cycle), for example. Further, as mentioned above, the phase between two bridges may be tightly regulated to get a desired output voltage level.

Figure 2:
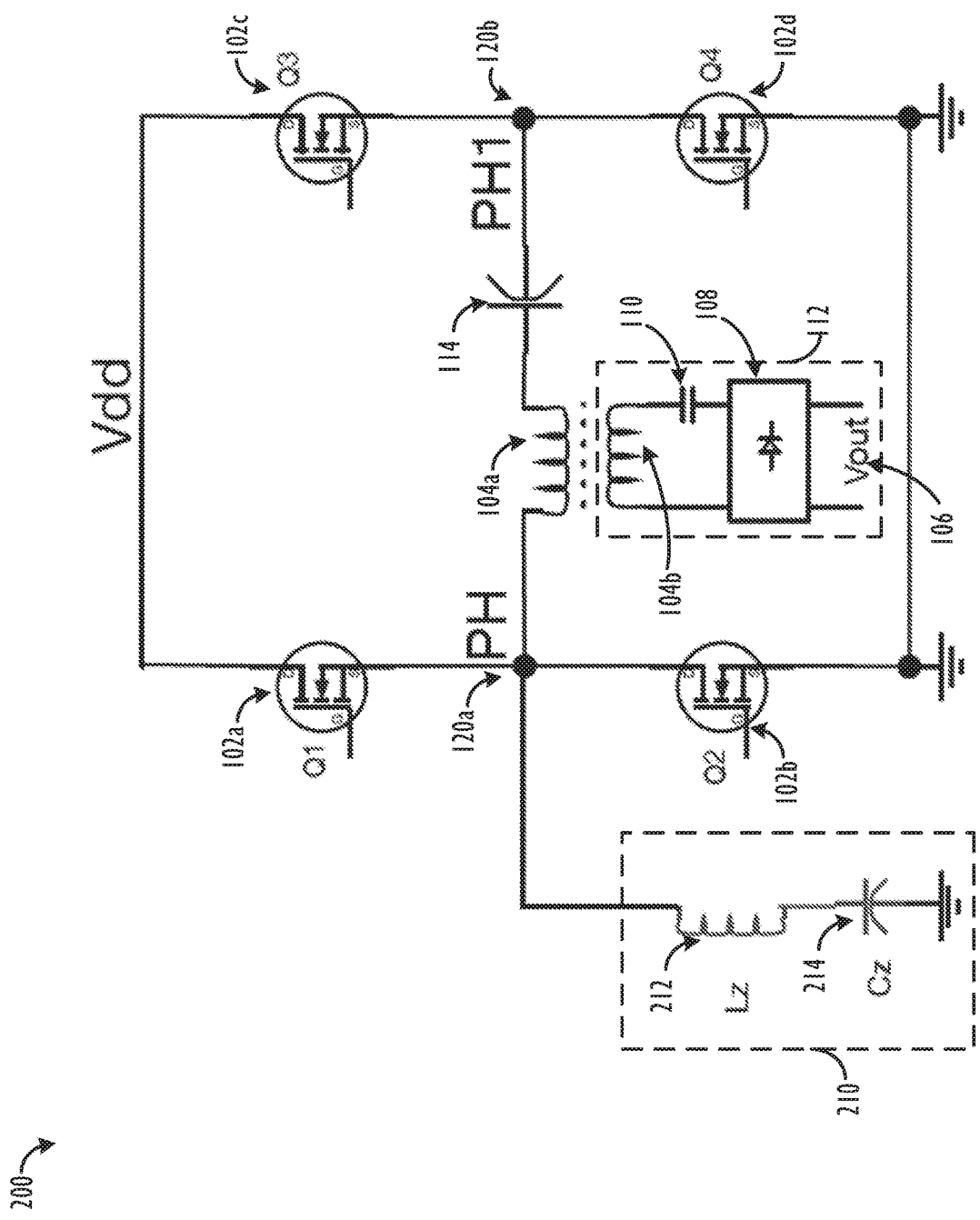
FIG. 2 is a block diagram of an exemplary phase-shift power conversion circuit comprising a ZVS LC tank.

Turning now to FIG. 2, a block diagram 200 of an exemplary phase-shift power conversion circuit comprising a ZVS LC tank 210 is shown. The additional ZVS LC resonant tank 210 may comprise an inductor Lz (212) and a capacitor Cz (214) connected in series. When the resonant frequency of the LC resonant tank 210 is much lower than the switching frequency, ZVS may be achieved for both bridges at most load conditions. However, when the resonant frequency of the LC resonant tank 210 is near the switching frequency, the leading bridge (PH) may lose ZVS at moderate to low load conditions. In the converter of FIG. 2, the additional LC resonant tank 210 is added to circulate an additional amount of negative current that is needed to achieve ZVS. However, as mentioned above, the addition of the LC resonant tank 210 increases the RMS current on the main power switches, which will impact the efficiency at heavy load conditions. Thus, it would be desirable to have a phase-shift, full-bridge converter design that could operate efficiently across all load conditions.

Figure 3:
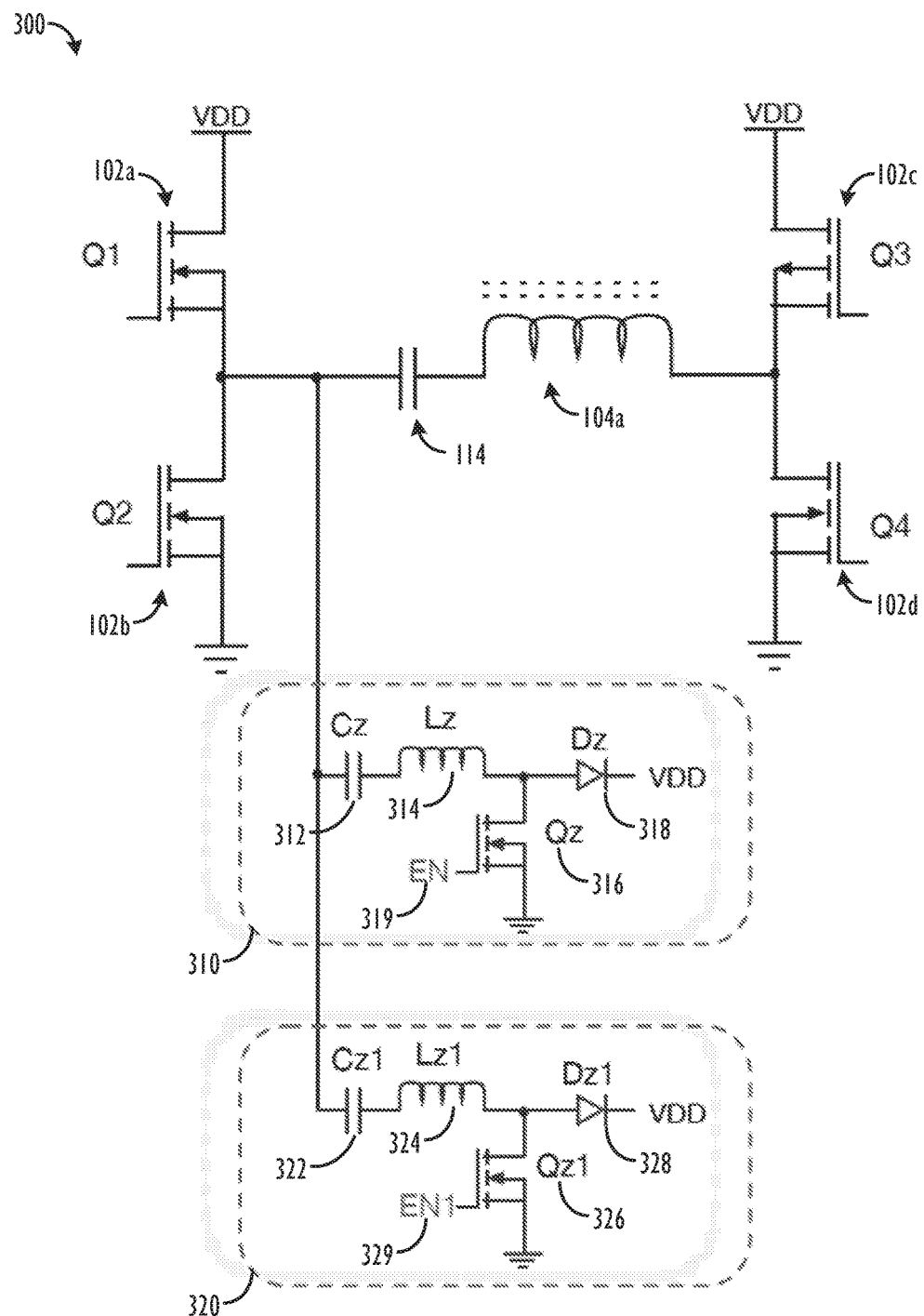
FIG. 3 is a block diagram of an exemplary phase-shift power conversion circuit comprising a plurality of selectable ZVS LC tanks, according to some embodiments disclosed herein.

Turning now to FIG. 3, a block diagram 300 of an exemplary phase-shift power conversion circuit comprising a plurality of selectable ZVS resonant LC tanks (310/320) is shown, according to some embodiments disclosed herein. Each of the resonant LC tanks (310/320) may comprise a capacitor, Cz (312)/Cz1 (322), connected in series with an inductor of a particular value, Lz (314)/Lz1 (324), a diode, Dz (318)/Dz1 (328), and a switch, Qz (316)/Cz1 (326), which may be enabled by control signals, EN (319) and EN1 (329), respectively. In some embodiments, the components for Cz (312) and Lz (314) may be selected to resonant at a frequency that is less than the switching frequency, such that the total impedance of the resonant LC tank (310) is inductive. Using the inductive load to the PH (120a) node allows the current to lag sufficiently, such that ZVS may be achieved. In some embodiments, the resonant LC tanks (310/320) may alternately share the same capacitor, Cz (312), e.g., to save on space and/or component costs.

Under heavy load conditions, all switches Q1-Q4 can operate at ZVS conditions, so long as the equivalent impedance for the resonant tank is inductive. Under moderate load conditions, the leading bridge switches (Q1 and Q2) may lose ZVS due to low negative (or even positive) current. If such a condition occurs, signal EN (319) may be pulled to '1' to turn ON Qz (316) and introduce some additional negative current to switches Q1 or Q2 to achieve ZVS.

Under low load conditions, signal EN1 (329) may also be pulled to '1' to turn on Qz1 (326) and to introduce even more negative current into the bridge in order to guarantee ZVS. By adding (or removing) the ZVS resonant LC tanks (310/320) in such a step-by-step fashion, e.g., based on the present load conditions, the impact on the converter's overall efficiency may be minimized, while achieving ZVS under a widely varying range of load conditions.

The size of the inductors, Lz (314)/Lz1 (324), in the ZVS resonant LC tanks may be the same, or they may be different. In some embodiments, one resonant LC tank inductor may be a multiple of the size of another resonant LC tank's inductor, e.g., twice as large or four times as large. The particular sizes and combinations of inductors used in the one or more resonant LC tanks in a given converter may be intelligently chosen such that their combination may be used to maintain ZVS at a wide range of load conditions in the most efficient manner possible. The combinations of LC tank circuits that are employed at a particular load level may be determined beforehand (e.g., in a testing laboratory), or they may be determined 'on-the-fly,' e.g., based on a feedback system within the circuit that indicates whether or not the converter is presently maintaining ZVS conditions (and, if it is not maintaining ZVS, how far away from maintaining ZVS it is). Based on the feedback, additional LC tank circuits (of the appropriate inductance) may be turned on (or off) as needed to re-establish ZVS conditions. According to some embodiments, the converter's overall efficiency may be maximized, e.g., by employing the minimum number of LC tank circuits for the minimum amount of time needed to maintain ZVS.

Figure 4:
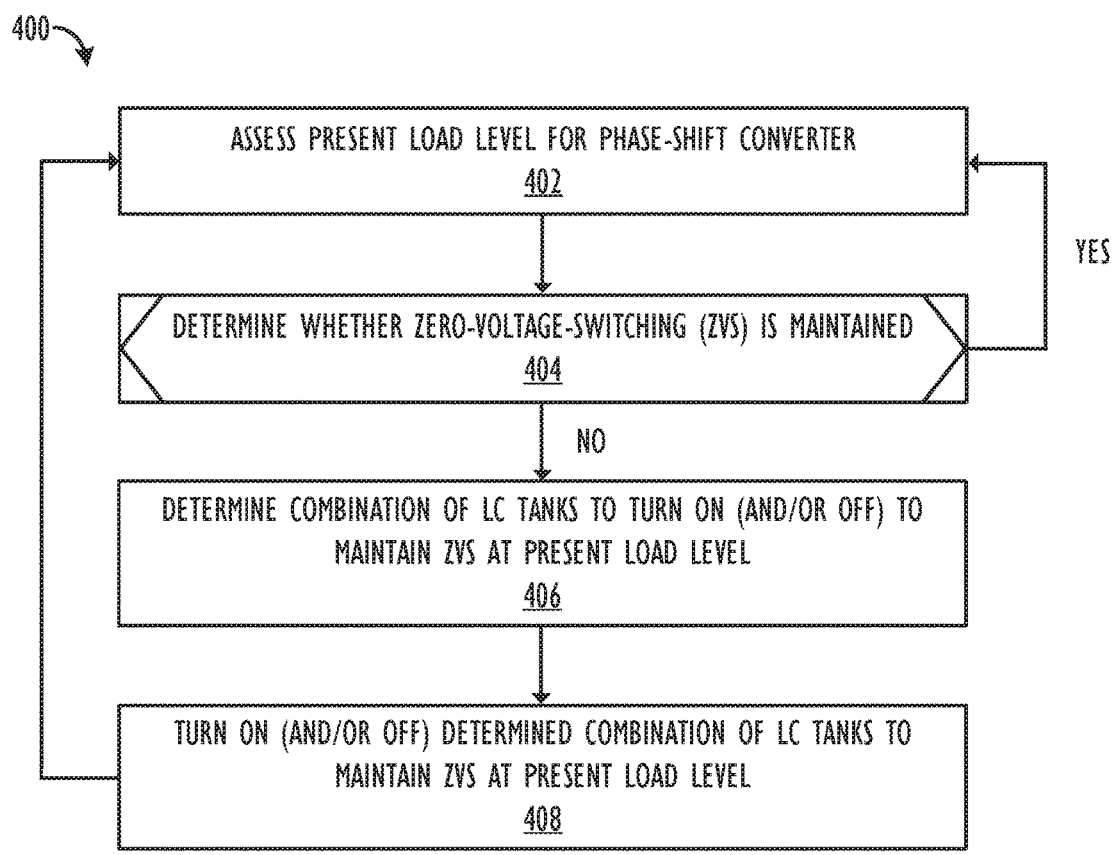
FIG. 4 is a flowchart illustrating a process for operating an exemplary phase-shift power conversion circuit comprising a plurality of selectable ZVS LC tanks, according to some embodiments disclosed herein.

Turning now to FIG. 4, a flowchart 400 illustrating a process for operating an exemplary phase-shift power conversion circuit comprising a plurality of selectable ZVS LC tanks is shown, according to some embodiments disclosed herein. First, the converter may assess the present load level that it is operating under (Step 402). Next, the converter may determine whether the switches are currently maintaining ZVS under the present load conditions (Step 404). If, at Step 404, the converter determines that it is currently maintaining ZVS, the process may simply return to Step 402 and continue to assess the changing load levels that the converter is facing. If, instead, at Step 404, the converter determines that it is not currently maintaining ZVS, the process may proceed to Step 406, wherein the converter intelligently determines a combination of ZVS LC tank circuits to turn on (and/or off) to maintain ZVS at the present load level. The process may then proceed to Step 408, which may, e.g., entail: turning on one LC tank circuit; turning on a particular combination of LC tank circuits; turning off an LC tank circuit; turning off a particular combination of LC tank circuits; or some combination thereof.

Exemplary Waveforms

Figure 5:
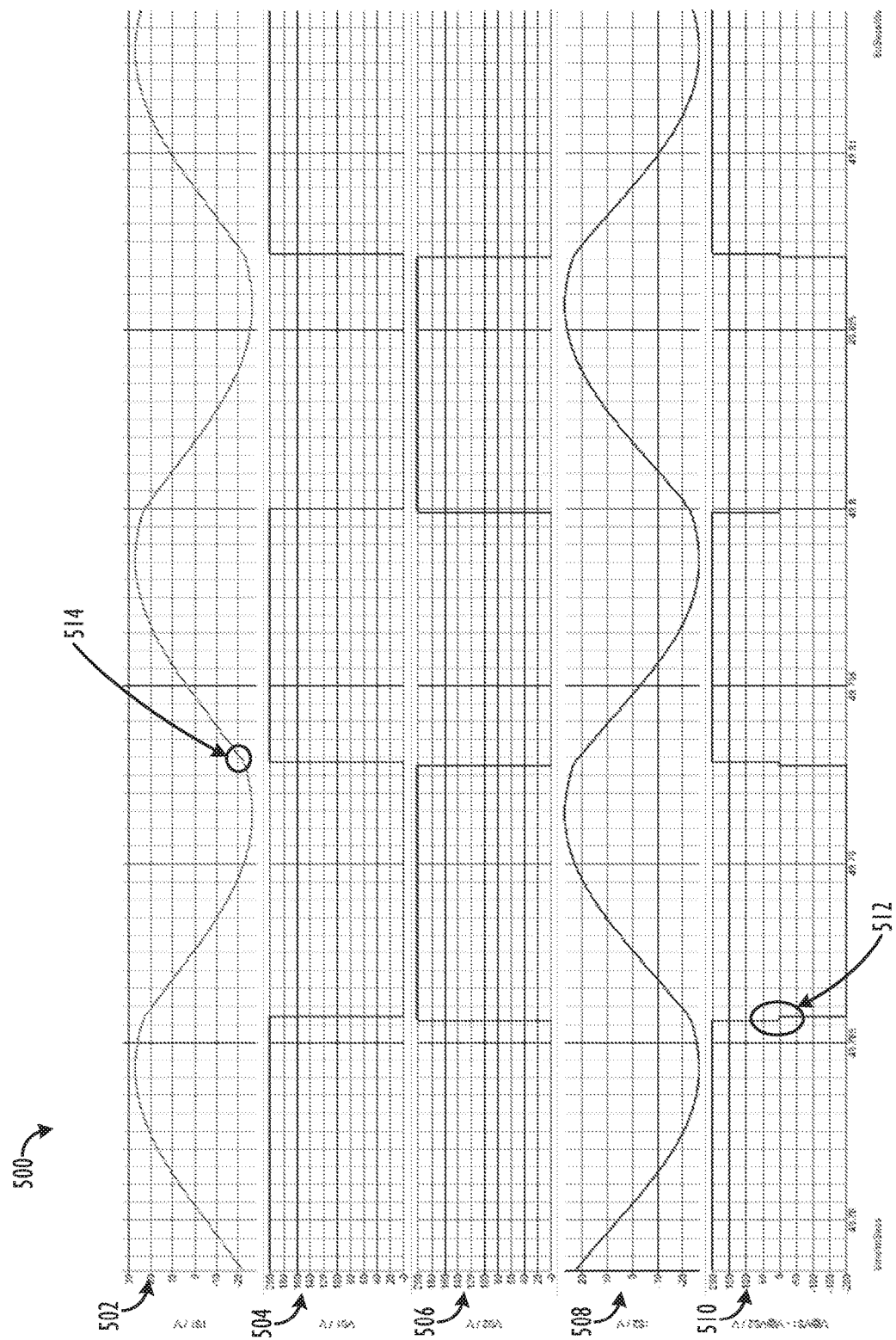
FIG. 5 illustrates waveforms of leading bridge and trailing bridge currents and switch voltages for an exemplary phase-shift power conversion circuit operating under high load conditions (e.g., under a full load).

FIG. 5 illustrates waveforms 500 of leading bridge and trailing bridge currents and switch voltages for an exemplary phase-shift power conversion circuit operating under high load conditions (e.g., under a full load). More particularly, waveform 502 illustrates the leading bridge current; waveform 504 shows the leading bridge switch voltage; waveform 506 illustrates the trailing bridge switch voltage; waveform 508 shows the trailing bridge current; and waveform 510 illustrates the switch voltage across the leading and trailing bridges. The "notch" 512 in waveform 510 represents the offset between the leading and trailing bridges. As is shown at element 514, the current for the leading bridge 502 in this example is about −22 A when its switch is turned on or off (e.g., VS1, the leading bridge switch voltage shown in waveform 504, jumps from 0V to 200V at time 49.7925 s, which corresponds to element 514 in waveform 502), which is low enough to be able to achieve ZVS.

Figure 6:
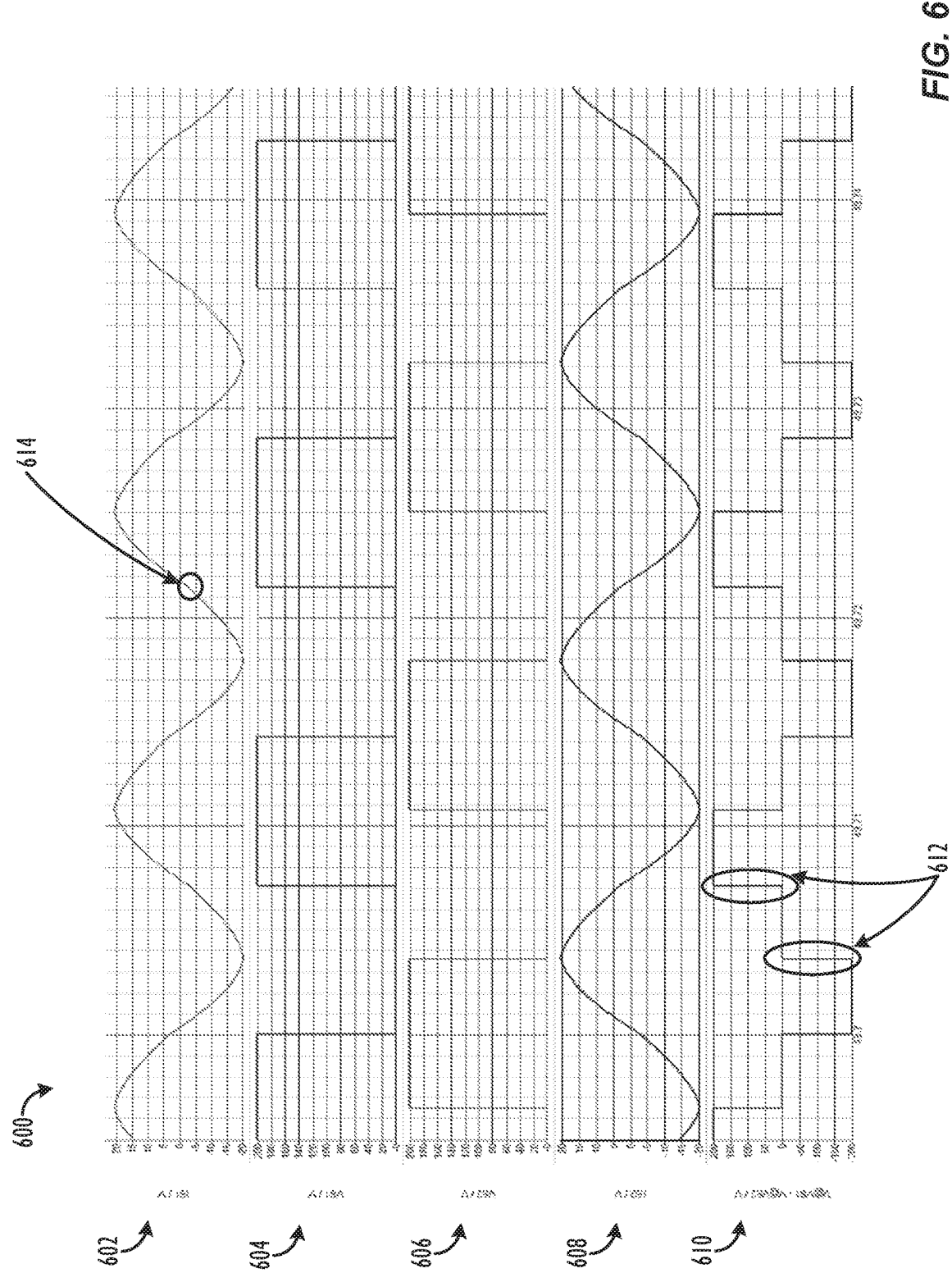
FIG. 6 illustrates waveforms of leading bridge and trailing bridge currents and switch voltages for an exemplary phase-shift power conversion circuit operating under moderate load conditions (e.g., under half of a full load).

FIG. 6 illustrates waveforms 600 of leading bridge and trailing bridge currents and switch voltages for an exemplary phase-shift power conversion circuit operating under moderate load conditions (e.g., half of a full load). More particularly, waveform 602 illustrates the leading bridge current; waveform 604 shows the leading bridge switch voltage; waveform 606 illustrates the trailing bridge switch voltage; waveform 608 shows the trailing bridge current; and waveform 610 illustrates the switch voltage across the leading and trailing bridges. The "notches" 612 in waveform 610 represent the offset between the leading and trailing bridges. As is shown at element 614, the current for the leading bridge 602 in this example is about −4 A when its switch is turned on or off, which is low enough to be able to achieve ZVS.

Figure 7:
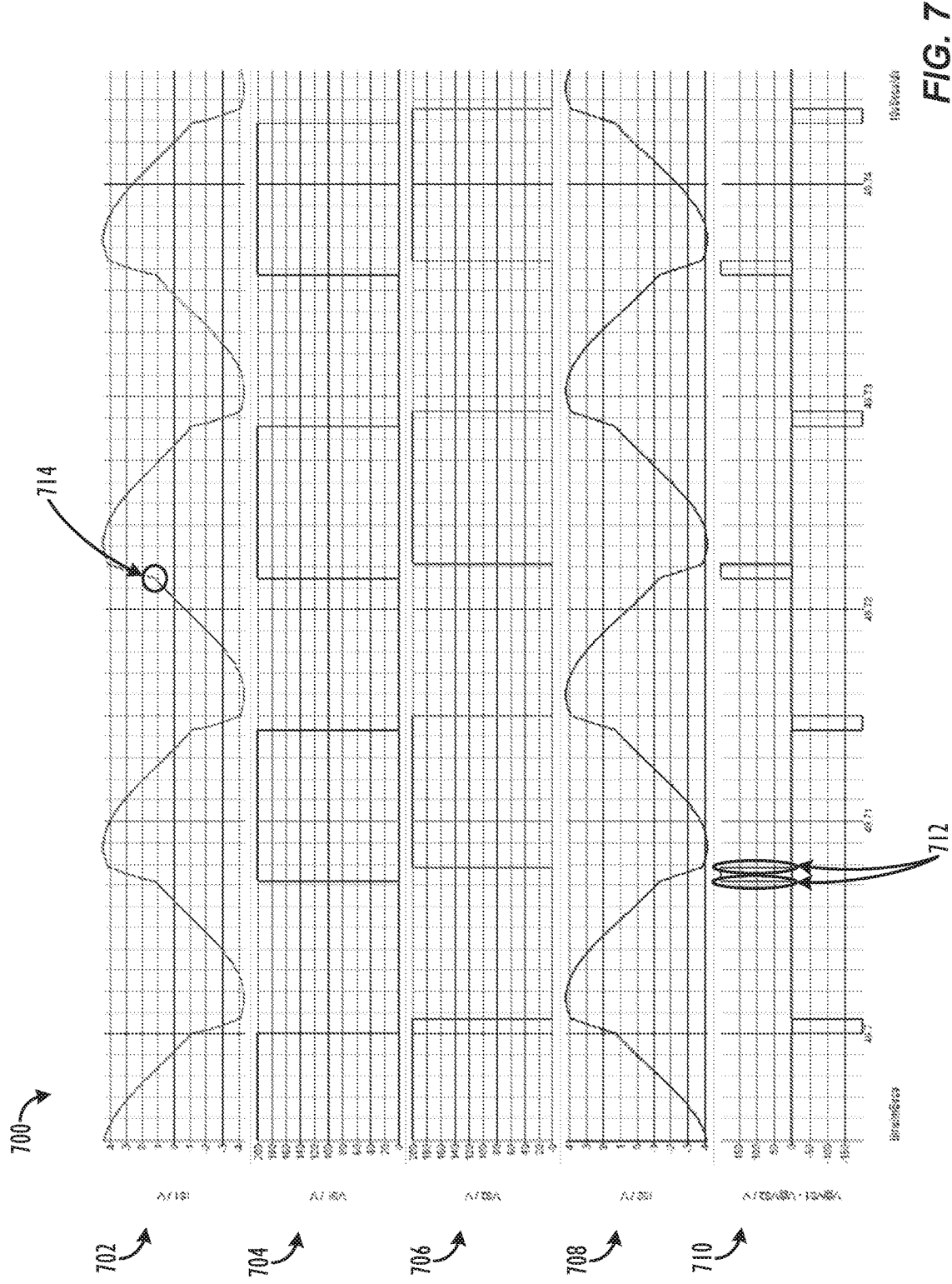
FIG. 7 illustrates waveforms of leading bridge and trailing bridge currents and switch voltages for an exemplary phase-shift power conversion circuit operating under low load conditions, without ZVS.

FIG. 7 illustrates waveforms 700 of leading bridge and trailing bridge currents and switch voltages for an exemplary phase-shift power conversion circuit operating under low load conditions, without ZVS. More particularly, waveform 702 illustrates the leading bridge current; waveform 704 shows the leading bridge switch voltage; waveform 706 illustrates the trailing bridge switch voltage; waveform 708 shows the trailing bridge current; and waveform 710 illustrates the switch voltage across the leading and trailing bridges. The "notches" 712 in waveform 710 represent the offset between the leading and trailing bridges. As is shown at element 714, the current for the leading bridge 702 in this example is about 1 A when its switch is turned on or off, which causes ZVS to be lost.

According to some embodiments, the 'high' load condition may comprise a first load threshold; the 'moderate' load condition may comprise a second load threshold; amd the 'low' load condition may comprise a third load threshold, wherein first load threshold is higher than second and third load thresholds, and wherein the second load threshold is higher than the third load threshold.

Figure 8:
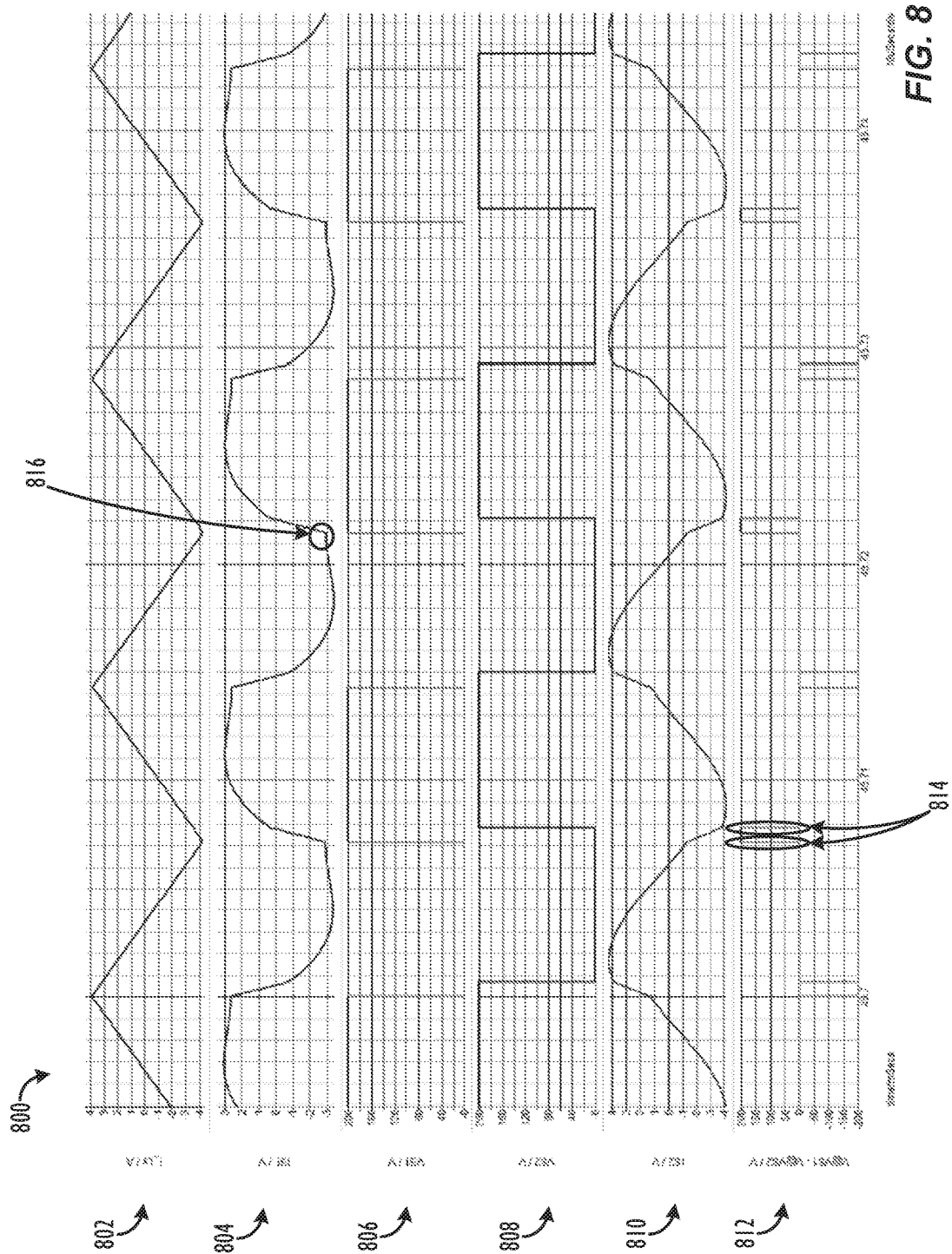
FIG. 8 illustrates waveforms of leading bridge and trailing bridge currents and switch voltages for an exemplary phase-shift power conversion circuit operating under low load conditions with ZVS, owing to the use of one or more ZVS LC tank circuits.

FIG. 8 illustrates waveforms 800 of leading bridge and trailing bridge currents and switch voltages for an exemplary phase-shift power conversion circuit operating under low load conditions with ZVS, owing to the use of one or more ZVS LC tank circuits. More particularly, waveform 802 illustrates the ZVS LC tank circuit current; waveform 804 illustrates the leading bridge current; waveform 806 shows the leading bridge switch voltage; waveform 808 illustrates the trailing bridge switch voltage; waveform 810 shows the trailing bridge current; and waveform 812 illustrates the switch voltage across the leading and trailing bridges. The "notches" 814 in waveform 812 represent the offset between the leading and trailing bridges. As is shown at element 816, owing at least in part to the fact that the ZVS LC tank circuit is at its peak negative current (see element 818), the current for the leading bridge 804 in this example is about −3 A when its switch is turned on or off, which allows ZVS to be maintained—even at the light load conditions.

Figure 9:
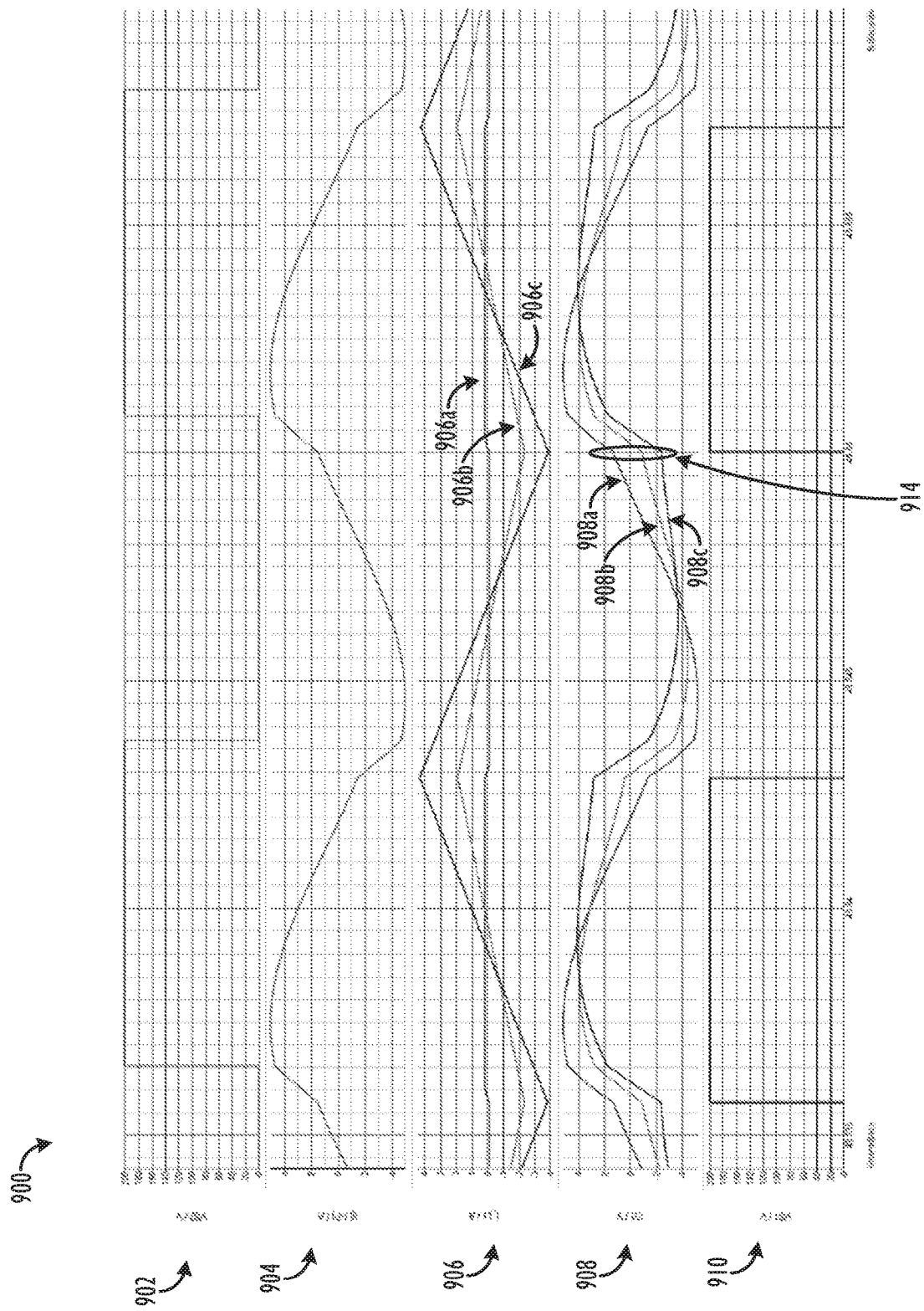
FIG. 9 illustrates waveforms of leading bridge and trailing bridge currents and switch voltages for an exemplary phase-shift power conversion circuit operating using various ZVS LC tank combinations.

FIG. 9 illustrates waveforms 900 of leading bridge and trailing bridge currents and switch voltages for an exemplary phase-shift power conversion circuit operating using various ZVS LC tank combinations. More particularly, waveform 902 illustrates the trailing bridge switch voltage; waveform 904 shows the trailing bridge current; and waveform 906 illustrates the ZVS LC tank currents for different LC tank inductances. In the examples shown in waveform 906, 906*a* represents the ZVS LC tank circuit current in a situation when the LC tank circuit(s) has been disabled; 906*b* represents the ZVS LC tank circuit current with a 168 nH inductance; and 906*c* represents the ZVS LC tank circuit current with an 88 nH inductance. Waveform 908 illustrates the leading bridge currents for different inductances; and waveform 912 illustrates the leading bridge switch voltage. As is shown at element 914, the potential currents for the leading bridge (based on the different possible LC tank inductances) could, e.g., be: 1.5 A (908*a*), which will not allow the converter to maintain ZVS; −1 A (908*b*), which might allow the converter to maintain ZVS; and −2.2 A (908*c*), which allows the converter to maintain ZVS. In some embodiments, if there is only one LC tank circuit, the RMS current may be too large, since the fixed current value needs to be sufficiently large for all situations, even though only a small amount of current may needed from the LC tank at any given point in time. The excess RMS current in such situations could also result in larger conduction losses. As may now be more clearly understood, by adding different LC tank circuits into the overall converter circuitry, the current for the leading bridge may be adjusted in order to minimize its impact on efficiency.

Figure 10:
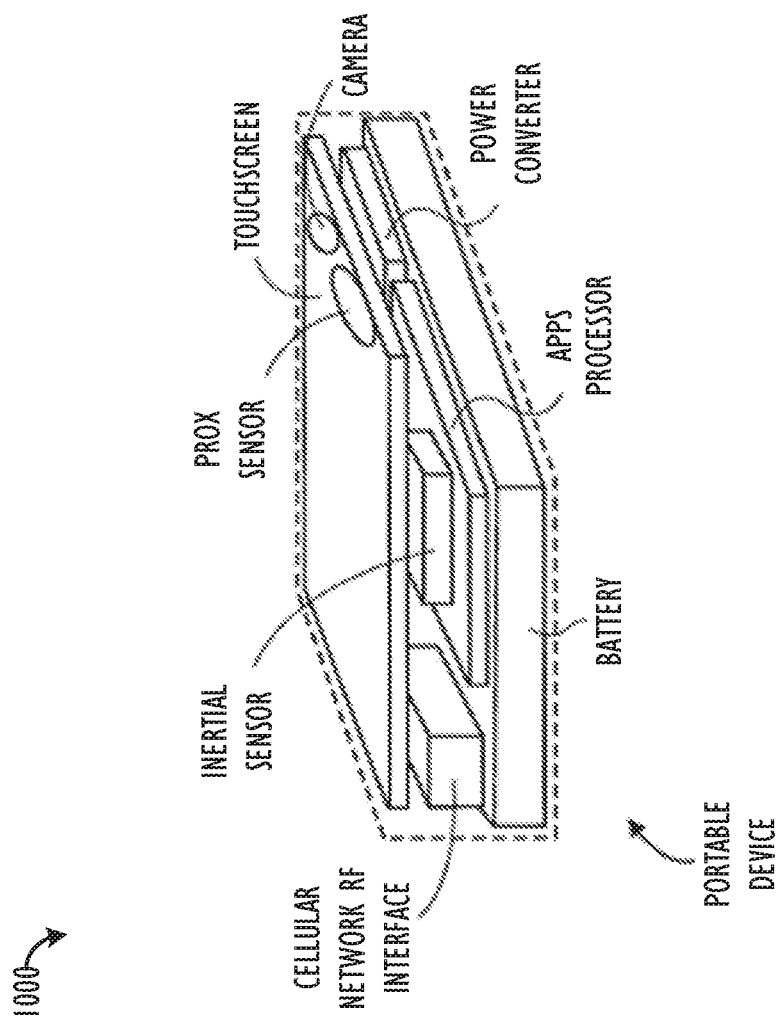
FIG. 10 is a block diagram of an example portable device in which a phase-shift power conversion circuit can be used.

Turning now to FIG. 10, an example portable electronic device 1000, in which an embodiment of the invention may be implemented is shown. While some of the benefits of the invention are more apparent in such power consumption-sensitive devices, an embodiment of the invention may also find use in non-portable electronic devices, such as desktop computers. The portable device shown has an external or outer housing (shown in dotted lines) in which a number of its constituent sub-systems may be installed, including, in this example, an applications processor, a cellular network RF interface, a digital camera, a touch screen, a proximity sensor and an inertial sensor. These sub-systems may be found in a typical smart phone or tablet computer that also contains a rechargeable battery to power all of the sub-systems shown. In other portable devices, some of these sub-systems may, of course, be absent. One or more of such sub-systems may be connected to be powered by an output node of a power conversion circuit as described above.

The power conversion circuit may be one or more DC-AC voltage regulating inverters (e.g., Class D inverters), that are connected in parallel to the same output node and are also installed in the housing of the portable device, in order to provide a regulated supply voltage to one or more connected sub-systems. An embodiment of the invention automatically and intelligently couples or decouples auxiliary LC tank circuits as needed to maintain ZVS in a phase-shifted, full bridge converter so as to help reduce switching losses across a wide range of load conditions and, in particular, under light load conditions.

Examples

The following examples pertain to additional embodiments.

Example 1 is a power conversion circuit comprising: first and second input nodes coupled to an input voltage; first and second output nodes coupled to a load; a plurality of switching devices, each switching device operatively coupled to at least one of: the first or second input nodes; or the first or second output nodes, wherein the plurality of switching devices are configured to operate as a full-bridge, phase shift converter, whereby controlling a phase shift between the switching of the switching devices regulates a load voltage; one or more resonant LC tank circuits configured to be selectively coupled to one or more of the output nodes in response to load conditions so as to maintain zero voltage switching of the switching devices.

Example 2 includes the subject matter of example 1, wherein the one or more resonant LC tank circuits comprise a first resonant LC tank circuit and a second resonant LC tank circuit.

Example 3 includes the subject matter of example 2, wherein: neither resonant LC tank circuit is coupled to the output nodes under high load conditions; the first resonant LC tank circuit is coupled to the output nodes under moderate load conditions; the first and second resonant LC tank circuits are coupled to the output nodes under low load conditions.

Example 4 includes the subject matter of example 2, wherein the first and second resonant LC tank circuits share a reactive element.

Example 5 includes the subject matter of example 4, wherein the shared reactive element is a capacitor.

Example 6 includes the subject matter of example 2, wherein the first and second resonant LC tank circuits have a same inductance.

Example 7 includes the subject matter of example 2, wherein the first and second resonant LC tank circuits have a different inductance.

Example 8 includes the subject matter of example 7, wherein the inductance of the first resonant LC tank circuit is half of the inductance of the second resonant LC tank circuit.

Example 9 includes the subject matter of example 1, wherein the one or more resonant LC tank circuits are further configured to be selectively decoupled from the output nodes in response to load conditions so as to maintain zero voltage switching of the switching devices.

Example 10 is a full-bridge phase-shift converter comprising: a first switching device having an input coupled to a voltage source and an output coupled to input of a second switching device, the second switching device having its output coupled to a voltage reference, the connection between the output of the first switching device and the input of the second switching device being a first intermediate node; a third switching device having an input coupled to the voltage source and an output coupled to an input of a fourth switching device, the fourth switching device having its output coupled to the voltage reference, the connection between the output of the third switching device and the input of the fourth switching device being a second intermediate node, wherein a load is connected between the first and second intermediate nodes and a load voltage supplied to the load is regulated by controlling a phase shift between switching of the first and fourth switching devices and switching of the second and third switching devices; and one or more resonant LC tank circuits configured to be selectively coupled to the first intermediate node in response to load conditions so as to maintain zero voltage switching of the switching devices.

Example 11 includes the subject matter of example 10, wherein the one or more resonant LC tank circuits comprise a first resonant LC tank circuit and a second resonant LC tank circuit.

Example 12 includes the subject matter of example 11, wherein: neither resonant LC tank circuit is coupled to the first intermediate node under high load conditions; the first resonant LC tank circuit is coupled to the first intermediate node under moderate load conditions; the first and second resonant LC tank circuits are coupled to the first intermediate node under low load conditions.

Example 13 includes the subject matter of example 11, wherein the first and second resonant LC tank circuits share a reactive element.

Example 14 includes the subject matter of example 13, wherein the shared reactive element is a capacitor.

Example 15 includes the subject matter of example 11, wherein the first and second resonant LC tank circuits have a same inductance.

Example 16 includes the subject matter of example 11, wherein the first and second resonant LC tank circuits have a different inductance.

Example 17 includes the subject matter of example 16, wherein the inductance of the first resonant LC tank circuit is half of the inductance of the second resonant LC tank circuit.

Example 18 includes the subject matter of example 10, wherein the one or more resonant LC tank circuits are further configured to be selectively decoupled from the output nodes in response to load conditions so as to maintain zero voltage switching of the switching devices.

Example 19 is a method of operating a power conversion circuit, comprising: operating a plurality of switching devices to selectively couple first and second input nodes to an input voltage; operating the plurality of switching devices to selectively couple first and second output nodes to a load, wherein the operation of the plurality of switching devices causes the power conversion circuit to act as a full-bridge, phase shift converter; controlling a phase shift between the switching of the switching devices to regulate a load voltage; and selectively coupling one or more resonant LC tank circuits to the first and second output nodes in response to load conditions, so as to maintain zero voltage switching of the switching devices.

Example 20 includes the subject matter of example 19, further comprising: selectively decoupling a first resonant LC tank circuit and a second resonant LC tank circuit under high load conditions; selectively coupling the first resonant LC tank circuit and decoupling the second resonant LC tank circuit under moderate load conditions; and selectively coupling a first resonant LC tank circuit and a second resonant LC tank circuit under low load conditions.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:
1. A power conversion circuit comprising:
first and second input nodes coupled to an input voltage;
first and second output nodes coupled to a load;
a plurality of switching devices, each switching device operatively coupled to at least one of: the first or second input nodes; or the first or second output nodes,
wherein the plurality of switching devices is configured to operate as a full-bridge, phase shift converter, whereby controlling a phase shift between the switching of the plurality of switching devices regulates a load voltage;
one or more resonant LC tank circuits each configured to be selectively coupled to and selectively decoupled from one or more of the first and second output nodes by a respective switching device separate from the plurality of switching devices in response to load conditions so as to maintain zero voltage switching of the plurality of switching devices.

2. The power conversion circuit of claim 1, wherein the one or more resonant LC tank circuits comprise a first resonant LC tank circuit and a second resonant LC tank circuit.

3. The power conversion circuit of claim 2, wherein:
none of the one or more resonant LC tank circuits is coupled to either of the first and second output nodes under high load conditions,
the first resonant LC tank circuit is coupled to the first and second output nodes under moderate load conditions, and
the first and second resonant LC tank circuits are coupled to the first and second output nodes under low load conditions.

4. The power conversion circuit of claim 2, wherein the first and second resonant LC tank circuits share a reactive element.

5. The power conversion circuit of claim 4, wherein the shared reactive element is a capacitor.

6. The power conversion circuit of claim 2, wherein the first and second resonant LC tank circuits have a same inductance.

7. The power conversion circuit of claim 2, wherein the first and second resonant LC tank circuits have a different inductance.

8. The power conversion circuit of claim 7, wherein the inductance of the first resonant LC tank circuit is half of the inductance of the second resonant LC tank circuit.

9. A full-bridge phase-shift converter comprising:
a first switching device having an input coupled to a voltage source and an output coupled to an input of a second switching device, the second switching device having its output coupled to a voltage reference, a connection between the output of the first switching device and the input of the second switching device being a first intermediate node;
a third switching device having an input coupled to the voltage source and an output coupled to an input of a fourth switching device, the fourth switching device having its output coupled to the voltage reference, a connection between the output of the third switching device and the input of the fourth switching device being a second intermediate node,
wherein a load is connected between the first and second intermediate nodes and a load voltage supplied to the load is regulated by controlling a phase shift between switching of the first and fourth switching devices and switching of the second and third switching devices; and
one or more resonant LC tank circuits each configured to be selectively coupled to and selectively decoupled from the first intermediate node by a respective switching device separate from the first, second, third, and fourth switching devices in response to load conditions so as to maintain zero voltage switching of the first, second, third, and fourth switching devices.

10. The full-bridge phase-shift converter of claim 9, wherein the one or more resonant LC tank circuits comprise a first resonant LC tank circuit and a second resonant LC tank circuit.

11. The full-bridge phase-shift converter of claim 10, wherein:
none of the one or more resonant LC tank circuits is coupled to the first intermediate node under high load conditions,
the first resonant LC tank circuit is coupled to the first intermediate node under moderate load conditions, and
the first and second resonant LC tank circuits are coupled to the first intermediate node under low load conditions.

12. The full-bridge phase-shift converter of claim 10, wherein the first and second resonant LC tank circuits share a reactive element.

13. The full-bridge phase-shift converter of claim 12, wherein the shared reactive element is a capacitor.

14. The full-bridge phase-shift converter of claim 10, wherein the first and second resonant LC tank circuits have a same inductance.

15. The full-bridge phase-shift converter of claim 10, wherein the first and second resonant LC tank circuits have a different inductance.

16. The full-bridge phase-shift converter of claim 15, wherein the inductance of the first resonant LC tank circuit is half of the inductance of the second resonant LC tank circuit.

17. The full-bridge phase-shift converter of claim 9, wherein the one or more resonant LC tank circuits are further configured to be selectively decoupled from a respective intermediate node in response to load conditions so as to maintain zero voltage switching of the first, second, third, and fourth switching devices.

18. A method of operating a power conversion circuit, comprising:
operating a plurality of switching devices to selectively couple first and second input nodes to an input voltage;
operating the plurality of switching devices to selectively couple first and second output nodes to a load,
wherein the operation of the plurality of switching devices causes the power conversion circuit to act as a full-bridge, phase shift converter;
controlling a phase shift between the operation of the plurality of switching devices to regulate a load voltage; and
selectively coupling one or more resonant LC tank circuits to the first and second output nodes and selectively decoupling the one or more resonant LC tank circuits from the first and second output nodes by one or more respective switching devices separate from the plurality of switching devices in response to load conditions, so as to maintain zero voltage switching of the plurality of switching devices.

19. The method of claim 18, further comprising:
selectively decoupling, from the first and second output nodes, a first resonant LC tank circuit and a second resonant LC tank circuit under high load conditions;
selectively coupling the first resonant LC tank circuit to the first and second output nodes and decoupling the second resonant LC tank circuit from the first and second output nodes under moderate load conditions; and
selectively coupling, to the first and second output nodes, the first resonant LC tank circuit and the second resonant LC tank circuit under low load conditions.

* * * * *